(12) United States Patent
Malaspino et al.

(10) Patent No.: US 8,070,116 B1
(45) Date of Patent: Dec. 6, 2011

(54) COOKWARE UNDERLINER

(75) Inventors: Bri Malaspino, South Pittsburg, TN (US); Jeanne Mynatt Scholze, South Pittsburg, TN (US)

(73) Assignee: Lodge Manufacturing Company, South Pittsburg, TN (US)

( * ) Notice: Subject to any disclaimer, the term of this patent is extended or adjusted under 35 U.S.C. 154(b) by 363 days.

(21) Appl. No.: 12/364,645

(22) Filed: Feb. 3, 2009

(51) Int. Cl.
*A47G 19/00* (2006.01)

(52) U.S. Cl. ............ 248/176.2; 248/309.1; 248/346.01; 220/573.1; 99/422

(58) Field of Classification Search ............ 248/346.01, 248/346.11, 309.1, 311.2; 220/573.1, 573.3, 220/62.11, 645; 99/422
See application file for complete search history.

(56) References Cited

U.S. PATENT DOCUMENTS

| | | | | |
|---|---|---|---|---|
| D255,208 S | * | 6/1980 | Greger | D7/388 |
| 5,809,630 A | * | 9/1998 | Coissard | 29/505 |
| 7,048,243 B1 | * | 5/2006 | Steinman | 248/346.01 |
| D552,424 S | * | 10/2007 | Hayes et al. | D7/585 |
| D560,094 S | * | 1/2008 | Miller | D7/388 |
| 2005/0040171 A1 | * | 2/2005 | Alim | 220/573.1 |
| 2005/0051157 A1 | * | 3/2005 | Cuomo | 126/275 R |
| 2006/0260473 A1 | * | 11/2006 | Nybakke et al. | 99/422 |
| 2010/0065571 A1 | * | 3/2010 | Olson | 220/573.1 |

* cited by examiner

*Primary Examiner* — Terrell McKinnon
*Assistant Examiner* — Steven Marsh
(74) *Attorney, Agent, or Firm* — Stephen J. Stark; Miller & Martin PLLC

(57) ABSTRACT

A cookware underliner as some having a top and bottom layer encapsulating at least a portion of a rigid frame. The top layer provides a base with upwardly extending sidewalls which receive a cooking article therein. The top and bottom layers are preferably constructed of silicon rubber or thermoplastic rubber and provide an attractive alternative to planar birchwood underliners currently available in the marketplace.

20 Claims, 3 Drawing Sheets

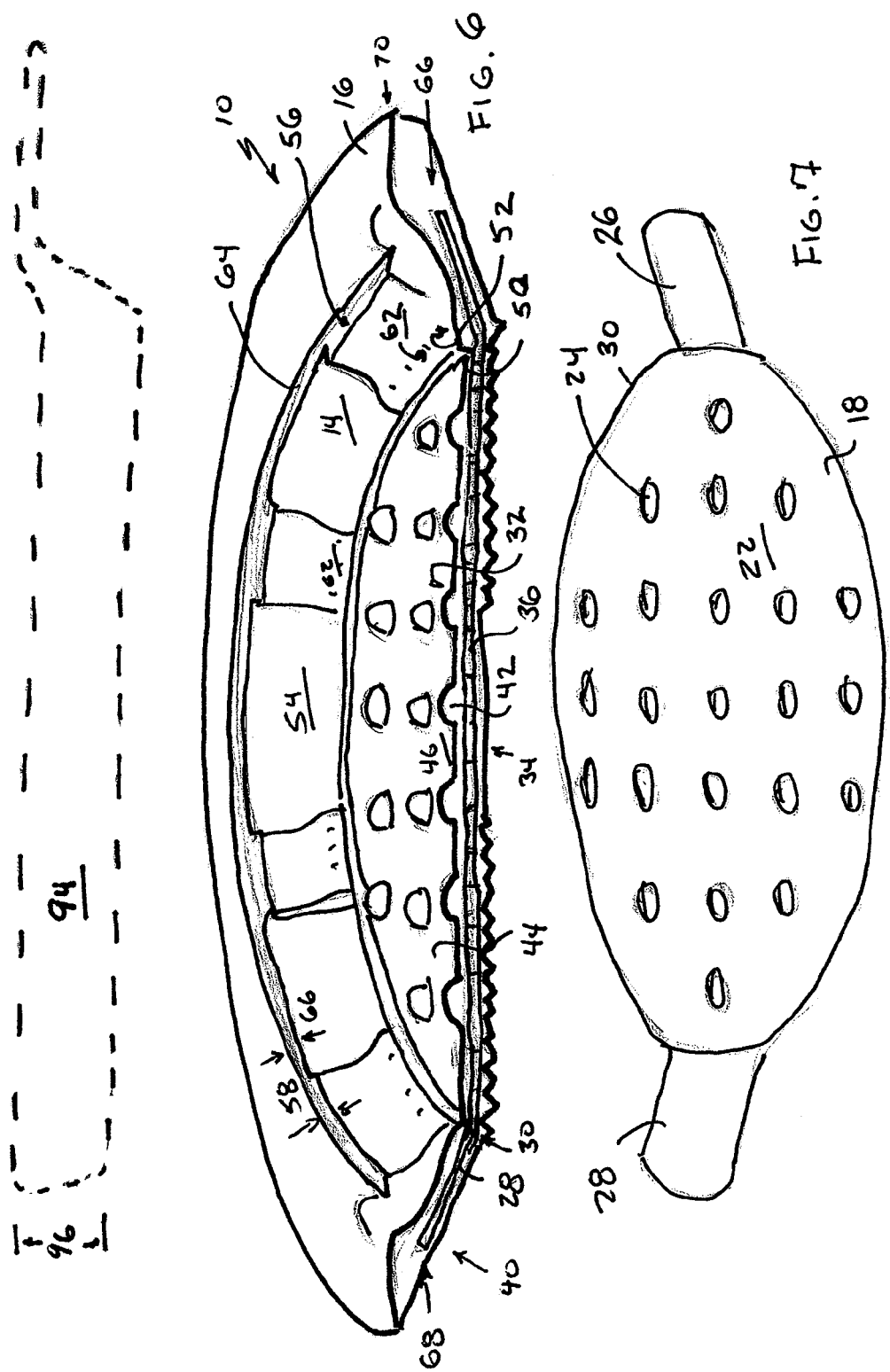

COOKWARE UNDERLINER

FIELD OF THE INVENTION

The present invention relates to an underliner for use with cookware, and more particularly, to a grill trivet such as may be utilized in the restaurant industry. More particularly, a silicon surfaced underliner may replace wood or other underliners, utilized to support hot cooking implements such as skillets and grills such as when serving fajitas at a restaurant or other dishes.

BACKGROUND OF THE INVENTION

In many restaurants across America today, one can order fajitas. The server often brings a hot skillet or grill to the table resting it on an underliner or trivet. Other dishes are also believed to be served in various restaurants with extremely hot cookware at the table.

A common way of supporting this cookware is to provide a wood underliner. Wood underliners provided by the applicant and others are typically a laminated and planar Baltic-birch product. While these products work excellently for their intended purpose, one perceived disadvantage is that when a hot grill or skillet is placed on the wood, burning of the wood can occur upon contact. A black burn line occurs usually starting with the very first use. Charring off layers or portions layers of the underliner is a common next step. After repeated uses, someone may decide to wash the underliner in a washing machine. These products are not dishwasher friendly. Further delamination and/or deterioration of the underliner can occur due to washing. Accordingly, these underliner products typically have a relatively short life span. After at least one, if not a few, uses, a somewhat unattractive surface appearance may appear. Accordingly, a perceived need exists to provide an improved underliner for various uses.

SUMMARY OF THE INVENTION

It is the object of the present invention to provide an improved underliner.

It is another object of at least some embodiments of the present invention to provide an improved underliner which can withstand any high temperatures of cookware without burning.

It is another object of at lest some embodiments of the present invention to provide an improved underliner which can assist in preventing inadvertent touching portions of hot cookware which could otherwise burn an employee of the restaurant or a customer.

It is another object of at least some objects of the present invention to provide a trivet or underliner having an imbedded frame surrounded by a heat resistant and dishwasher safe material and in some embodiments even non-slip surfaces.

It is yet still another object of at least some embodiments of the present invention to provide a slip resistant underliner configured to retain a hot cooking article thereon without burning a horizontal resting surface and preferably resisting movement of the hot cooking article relative to the underliner.

Accordingly, a presently preferred embodiment of the present invention provides an improved underliner having a heat resistant non-slip surface disposed towards the cooking article and preferably a second non-slip surface directed towards a horizontal resting surface such as a table that the cooking article is supported by through the underliner. Between at least a portion of the top and bottom layers is preferably a frame which is utilized to impart structural stability to the underliner. The frame preferably includes at least extensions which extend upwardly from a somewhat planar base. The underliner has a side wall preferably may rely on the extensions for support. Furthermore, from the boundary wall a lip preferably extends to provide an outermost periphery of the underliner. The base may include a plurality of protrusions and the bottom may include a series of ridges both of which may assist in the insulating characteristics of the underliner.

A hot cooking article such as one of 450° to 500° can be placed on the underliner and then be safely carried by a waiter to a table without burning his hand with the underliner between the waiter's hand and the hot cookware. Furthermore, this underliner is preferably constructed of dishwasher safe, FDA (Food and Drug Administration) approved materials and does not burn at temperatures at temperatures to which cooking articles are normally subjected.

BRIEF DESCRIPTION OF THE DRAWINGS

The particular features and advantages of the invention as well as other objects will become apparent from the following description taken in connection with the accompanying drawings in which:

FIG. 6 is a cross-sectional view taken along the line A-A in FIG. 1; and

FIG. 7 shows a top perspective view of the frame removed from the embodiment of FIGS. 1-6.

DETAILED DESCRIPTION OF THE PREFERRED EMBODIMENT

Figure 1:
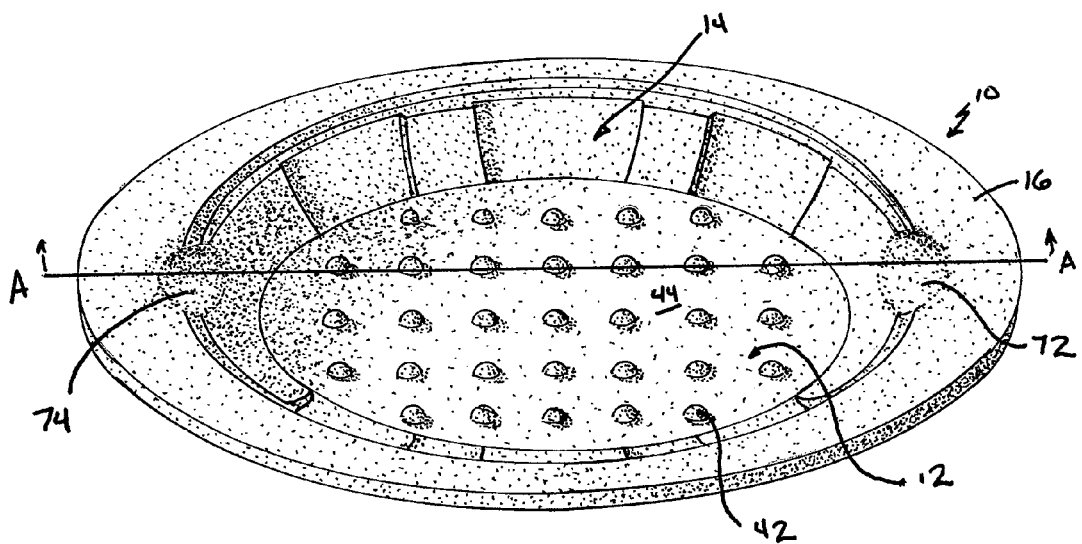
FIG. 1 is a top perspective view of a improved underliner in accordance with the presently preferred embodiment of the present invention.
Figure 2:
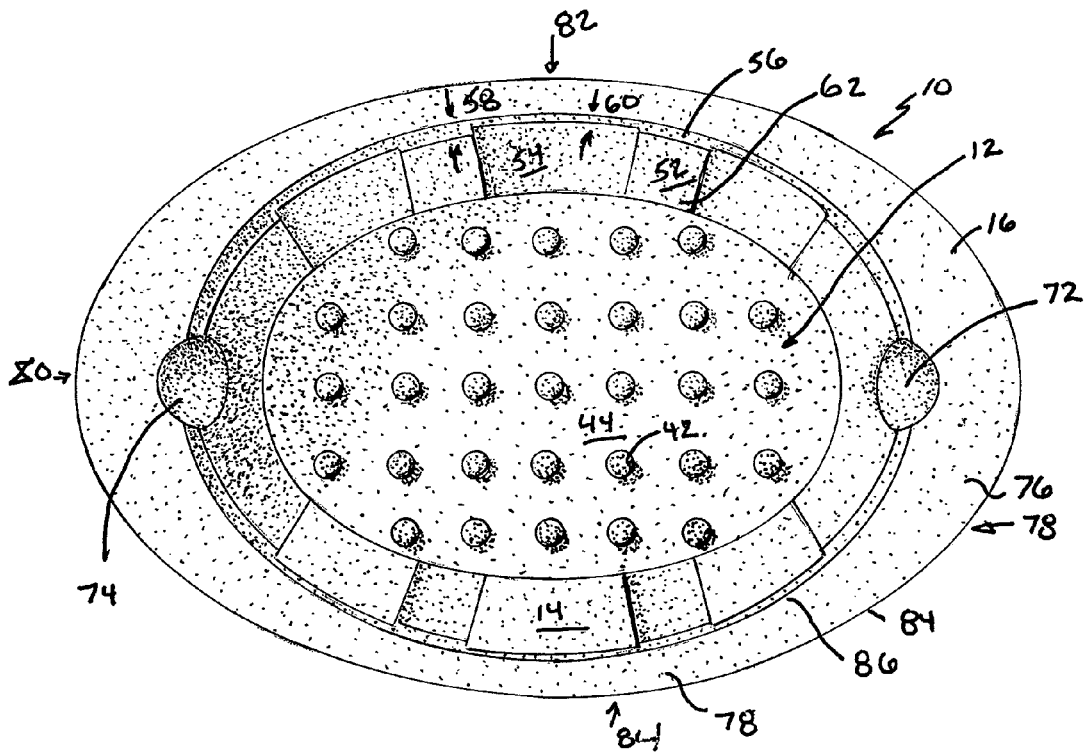
FIG. 2 is a top plan view of the underliner shown in FIG. 1.

FIG. 1 shows an underliner 10. Underliner 10 is shown having a base 12 sidewall portions 14 and lip 16. Other embodiments may have these and/or other structures.

Although many of the surface features are relevant and will be discussed below, the construction of this underliner 10 of the presently preferred embodiment can be best shown with reference to FIGS. 6 and 7. Specifically, FIG. 6 shows a cut away view of the underliner 10. Frame member also known as frame 18 is shown from a perspective view in FIG. 7. Frame 18 could be constructed from a number of materials such as metal, like stainless steel, or other metals, plastic such as heat resistant plastics often marketed under the Ultem® trademark owned by Sabic Innovative Plastics, although other competitive products, and still other materials as well.

With one embodiment shown in FIG. 1, nylon was attempted to be utilized as a frame 18, but for the prototype developed, the nylon frame 18 proved to be unsatisfactorily brittle at the thickness 20 utilized. Other embodiments with a thicker nylon based frame 18 may prove to be satisfactory. Although a single frame 18 is illustrated, multiple frame portions could be utilized in other embodiments. Frame portions may connect or remain spaced apart from one another.

Frame 18 is shown having planar support surface 22. Support surface may be provided with a plurality of openings 24 which can provide multiple benefits in the preferred embodiment. One such benefit, while specifically not addressing other known benefits, is a reduced weight of the frame. Other frames 18 may, or may not, have openings 24 which may be similarly or dissimilarly constructed.

Extensions 26 and 28 are illustrated extending from support surface 22. Extensions are useful to assist in supporting and/or defining side wall 24 to preferably provide at least some structural strength thereto. Although extensions 26 and 28 are shown extending only partially around periphery 30 of frame 18, one or more different shaped extensions 26 and/or 28 could be provided to provide at least some structural support about a larger portion of periphery 30 in other embodiments. As can be seen with reference to FIG. 6, extensions 26,28 may assist in defining the side wall 14 as well as even providing support for at least a portion of lip 16.

The frame 18 is preferably installed relative to upper layer 32 and lower layer 34 such as by imbedding the frame 18 in a mold and then forming the upper layer 32 and lower layer 34 thereabout. The upper and lower layer can therefore join together at connectors 36 which are located at the bores 24 shown in FIG. 7 as well as toward the front and the rear of the frame 18 as well as above the periphery 30 and/or about the extensions 26,28. Other methods of construction would be obvious to those of ordinary skill in the art.

The upper and lower layers 32,34 preferably employ a silicon product. Rubber or thermoplastic rubber (tpr) could also be utilized. Either or both of the upper and lower layers 32,34 preferably provide at least partially non-slip surfaces. Furthermore, the selected silicon-like products identified above and now specifically defined as silicon like materials are heat resistant. Some silicons are known to provide heat resistance of up to at least about 600° F. to 800° F. In addition, other properties of the layers 32,34 may include an ability to be dishwasher safe and are FDA approved materials. From an aesthetic point of view, silicons can be colored in virtually any color. While this group of materials are referred to silicon-like materials, other non-silicon-like materials could be utilized in other embodiments for one or both of the upper and lower layers or portions thereof.

In a presently preferred embodiment, when silicone-like materials are utilized for the upper and lower layers 32,34, they can cooperate to encapsulate at least a portion, if not all, of the frame 18. In other embodiments, a portion of frame 18 may be left exposed and/or covered by other materials. Furthermore, like in the preferred embodiment, additional structural materials such as portions of the sidewall 14 which do not have underlying extensions 26,28 embedded therein can still provide structural characteristics to the underliner 10 apart from the frame 18 as can be seen by reviewing FIGS. 7 and 8 as well as FIG. 1. Much of the side wall 14 of a preferred embodiment lacks the extensions 26,28 providing direct support of extensions 26,28 thereunder.

Figure 3:
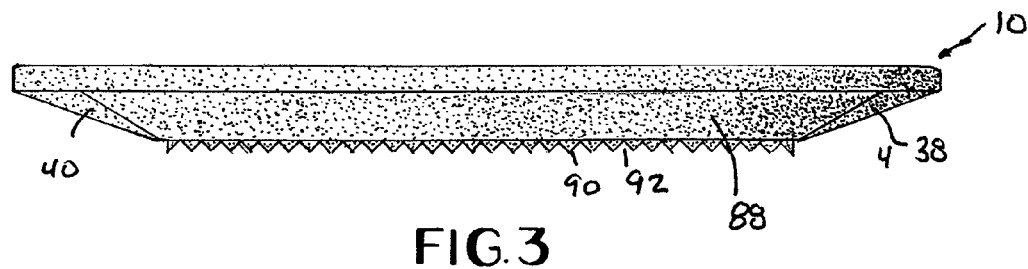
FIG. 3 is a front view of the underliner shown in FIG. 2.

FIG. 3 is useful to show supports 38,40. Supports 38,40 are also shown in cross-sectional form in FIG. 6 which receives the extensions 26,28 therein. Supports 38,40 may be a part of sidewalls 14 and/or lip 16 or may be a separate feature.

Referring back to FIG. 1, the base 12 preferably provides a planar surface in a preferred embodiment and a non-perforated support platform for receiving the base of cooking articles such as a grill or skillet thereon. Other bases 12 may be perforated. The base may be provided with one or more elevated protrusions that extend upwardly from planar surface 44. In the illustrated embodiment, a number of elevated protrusions 42 are substantially semi-circular in shape. Protrusions may extend to provide a contact area for the base to contact a grill or other cookware article when in use. Furthermore, as can be seen with reference to FIG. 6, spaces 46 between intermediate protrusions 42 can create one or more air pockets to assist in providing an air insulating barrier.

Sidewall 14 is illustrated as extending upwardly relative to base 12. Sidewall 14 in this embodiment surrounds periphery 30 of frame 18 as shown in FIG. 7. A lower sidewall portion 48 provides a periphery internal to periphery 30 of the frame as illustrated in FIG. 6 and is helpful in this embodiment to define base 12. The sidewall 14 from the lower sidewall portion 48 preferably extends upwardly such as to provide a upward wall 50 which can be perpendicular or otherwise oriented relative to the base 12. From the upward wall 50, the sidewall then can continue through one or more upward slopes 52,54 such as to ledge 56. The slopes 52,54 may have differing thicknesses 58,60 at the ledge 56. Slope 52 is useful particularly when utilized in combination with spaced apart slopes 52 such as illustrated in Figures. Air pockets adjacent to slopes 54 can further assist in providing insulating effects. In fact, bumpers 62 may be the only portion of sidewalls that contact a grill and/or skillet or other cookware item when installed.

Lip 16 preferably extends outwardly relative to sidewall 14. Lip 16 may first extend upwardly such as spaced by projection 64 which may provide a perimeter about and assist in defining sidewall 14 about its periphery. Projection 64 preferably surrounds base 12 as well as periphery 30 of frame 18. In the illustrated embodiment, the projection 64 does not extend beyond a perimeter designed by ends 66,68 of the projections 38,40 of the frame 18. However, other embodiments may have other constructions. Lip 16 preferably is provided with a periphery 70 which extends beyond the peripheries defined the projection 64 as well as the ends 66,68 or of the extensions 38,40. Lip 16 is illustrated as being planar and perpendicular to base 12 but may not be so in all embodiments. Cutouts 72,74 are useful to assist in for many grills, griddles and skillets to transition from the cooking article to the handle so that the bottom of the cooking article fits down through the lip 16 into one or both of the cutouts 72,74. The cooking article can then contact the elevated protrusions 42, if provided, while providing the cooking article in a level orientation while resting on the base 12. Lip 16 may have a thicker portion 76 such as at opposing sides 78,80 which can be distinguished from narrower portions 78 disposed towards the front 80 and back 82 in at least some embodiments. Accordingly, the perimeter 84 of a lip 16 may be more elongated relative to the axis defined by A-A in FIG. 1 relative to a periphery 86 defined by the projection 64. Cutouts 72,74 are illustrated interrupting the periphery 86.

In looking at exterior portions of the underliner, supports 38,40 extend at an elevation below outer exterior surface 83 of sidewalls 14 as shown in FIG. 3. Furthermore, FIG. 3 also shows a plurality of ridges 90 which provide a series of valleys 92 which when placed upon a surface such as a person's hand or on a table, once again may provide air pockets in the valleys 92 which can have insulating effects relative to a hot cooking article which could be at 450° or higher relative to a table or hand. Ridges 90 may be interrupted by design element 94 which could be a logo of the manufacturer, customer, or other design.

While the wood underliners often weigh roughly 14 ounces, the applicant's underliner 10 as illustrated, weighs one pound, fourteen ounces when silicon is utilized to coat a stainless frame 18 as illustrated. Other weights may come into play as thermoplastic, rubber, and/or other silicone like materials are utilized with various frames 18. A lighter or heavier frame 18 could also be provided in other embodiments which could also affect the weight.

It is perceived an advantage of the preferred embodiment to provide a construction of dishwasher safe materials which are heat resistant and FDA approved. This may not necessarily be the case for all embodiments. The silicon-like materials are known to withstand 600-800° F. without burning. An anticipated life of an underliner 10 is believed to be significantly greater than the wood alternatives presently offered in the market place.

Although frame 18 is shown in the presently preferred embodiment, it may not be required in other embodiments and/or may be provided in different forms.

Figure 4:
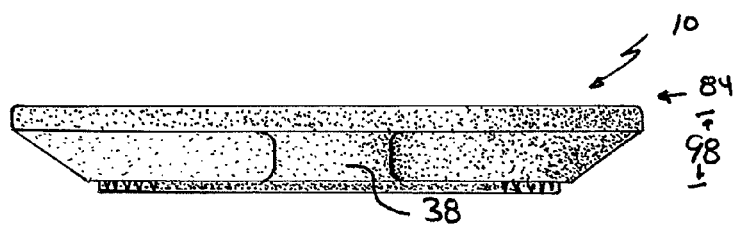
FIG. 4 is a right side of the underliner.
Figure 5:
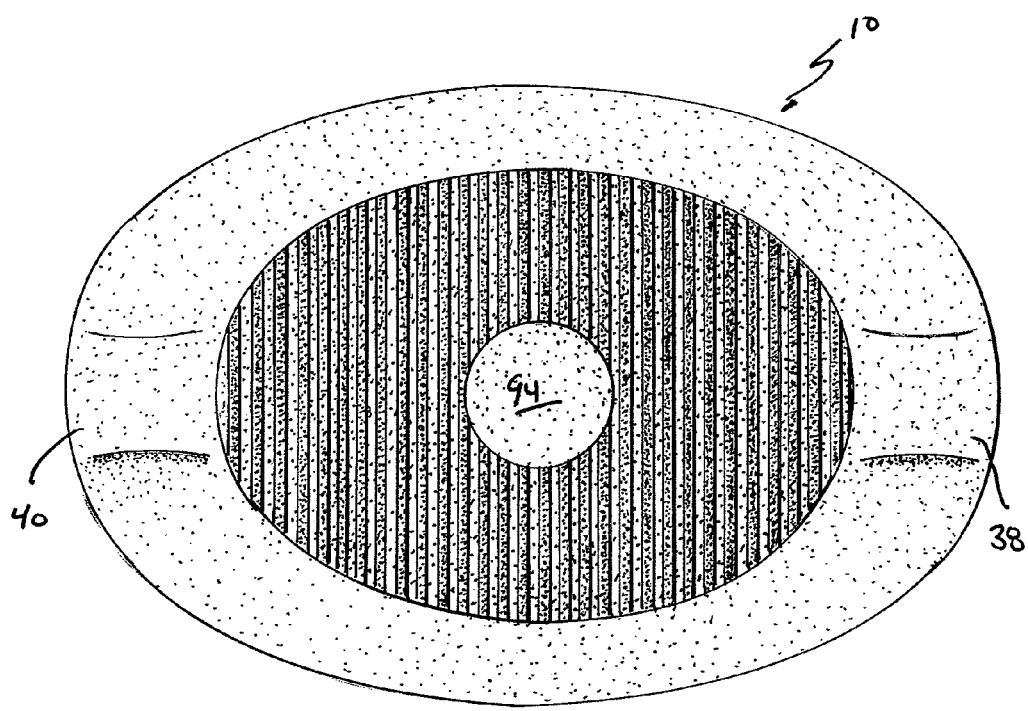
FIG. 5 is a bottom view thereof as shown in FIG. 1.

A portion of a cookware article is illustrated in phantom in FIG. 6 as representing a grill 94 or a skillet. As can be seen in this illustrated embodiment, the height 96 of the grill 94 is greater than the height 98 shown in FIG. 4 which is a height from the top of the protrusions 42 of base 12 to the top of the lip 16. In fact, the height 96 may be greater of preferably at least as high as the height 98 shown in FIG. 4. However, in other embodiments, height 96 may be up to twice the height 96 or other height. Accordingly, the sidewalls 14 can extend roughly at least half the height 96 or a substantial portion of the height 96 to potentially assist in protecting the various users from inadvertent burning.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A cookware underliner and cookware article combination comprising:
a top layer connected to a bottom layer with a rigid frame therebetween; wherein said top layer forms at least a portion of a base of the cookware underliner connected to an upwardly extending sidewall, said underliner provided as a separate component relative to and configured to cooperate with a cookware article, wherein when the cookware article is resting on the base of the underliner, said sidewalls extends a height up to at least half of the height of the cookware article, and the top layer being non-slip and heat resistent to at least about 600° F.

2. The cookware underliner and cookware article combination of claim 1 wherein the sidewall provides a continuous periphery about at least a portion of the base.

3. The cookware underliner and cookware article combination of claim 2 wherein the sidewall further comprises first and second slope portions, with the first slope portions providing a bumper spaced internally to adjacent second slope portions thereby assisting in defining an air gap intermediate the second slope portion and the cookware article when resting on the base.

4. The cookware underliner and cookware article combination of claim 3 wherein the sidewall extends upwardly to a lip which provides a periphery about the base.

5. The cookware underliner and cookware article combination of claim 2 wherein the frame further comprises extensions which extend upwardly from the base and directly support at least portions of the sidewall.

6. The cookware underliner and cookware article combination of claim 5 wherein the extensions extend into at least portions of the continuous periphery.

7. The cookware underliner and cookware article combination of claim 6 wherein the extensions are disposed on opposing ends of a planar portion of the frame and extend upwardly therefrom, and portions of the sidewall span between the extensions continuously from the base to the lip, with the lip providing a continuous periphery about the base and the bottom layer being non-slip and heat resistant to at least about 600° F.

8. The cookware underliner and cookware article combination of claim 1 wherein the frame extends through at least a substantial portion of the base.

9. The cookware underliner and cookware article combination of claim 8 wherein the frame has at least one opening therethrough and the top layer connects to the bottom layer at a connection in the opening.

10. The cookware underliner and cookware article combination of claim 9 further comprising a plurality of openings.

11. The cookware underliner and cookware article combination of claim 1 wherein the top and bottom layers at least substantially encapsulate the frame.

12. The cookware underliner and cookware article combination of claim 1 wherein the top layer is at least one of dishwasher safe and FDA approved as of the date of filing of this application.

13. A cookware underliner and cookware article combination comprising:
a rigid frame encapsulated within a top and bottom layer; wherein said top layer forms at least a portion of a base of the cookware underliner connected to an upwardly extending sidewall, and a cookware article, wherein when the cookware article is resting on the base of the underliner, said sidewall extending a height up to at least half of the height of the cookware article when resting on the base, and wherein at least one of the top and bottom layer is selected from the group of silicons, rubbers and thermoplastic rubbers having a heat resistance exceeding 500° F.

14. The cookware underliner and cookware article combination of claim 13 further comprising a lip extending from the sidewall and wherein the base has a planar portion, and the planar portion and the lip are parallel.

15. The cookware underliner and cookware article combination of claim 13 wherein the frame further comprises at least one upwardly extending extension, and said extensions supports at least a portion of the sidewall.

16. The cookware underliner and cookware article combination of claim 13 wherein the base further comprises a plurality of protrusions, and a lower surface of the bottom layer further comprises a plurality of parallel ridges defining valleys therebetween.

17. The cookware underliner and cookware article combination of claim 13 wherein the base is non-perforated.

18. A cookware underliner and cookware article combination comprising:
a rigid frame at least substantially encapsulated between resilient top and bottom layers;
wherein said top layer forms at least a portion of a base of the cookware underliner; and
a cookware article wherein when the cookware article is resting on the base of the underliner, said base having a plurality of protrusions extending upwardly from a planar portion supporting the cookware article when resting thereon above the planar portion defining a space therebetween, the top and bottom layer selected from the group of silicons, rubbers and thermoplastic rubber and having a heat resistance exceeding 500° F.

19. The cookware underliner and cookware article combination of claim 18 further comprising parallel ridges defining valleys in the bottom layer.

20. The cookware underliner and cookware article combination of claim 18 wherein the top and bottom layers are dishwasher safe.

\* \* \* \* \*